Patented Dec. 7, 1926.

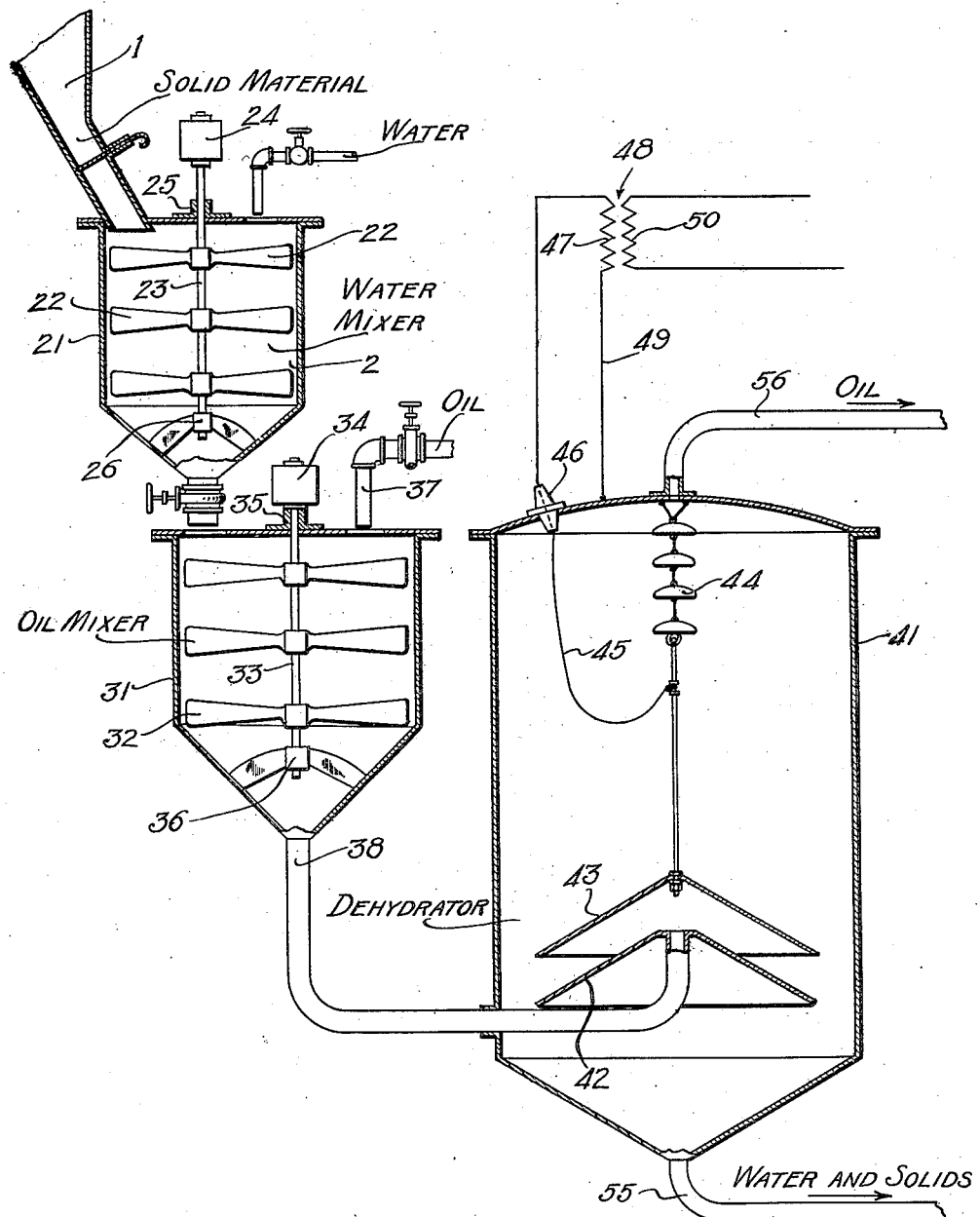

1,609,546

UNITED STATES PATENT OFFICE.

FORD W. HARRIS, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA.

PROCESS OF SEPARATING WATER FROM EMULSIONS.

Application filed November 19, 1925. Serial No. 70,205.

My invention relates to the art of dehydrating oils and is particularly applicable to the dehydration of oil by the so-called electrical process. In this process the emulsions, which consist of fine water particles carried in the body of the oil, are subjected to the action of a high potential alternating electric field which tends to agglomerate the fine water particles of the emulsion into large masses of free water which readily settle out from the oil under the influence of gravity.

It is a well known fact that certain emulsions which contain only very fine water particles are extremely difficult to separate by the electrical process. I have discovered that if there are introduced into these emulsions relatively large particles of solid material which have an affinity for water, these solid particles act as nuclei for the agglomeration of the large water particles. I prefer to use as such nuclei certain of the porous earths commonly known as kieselguhr or infusorial or diatomaceous earth.

It is an object of my invention to provide a process and apparatus by which emulsions may be dehydrated in accordance with my discovery.

Referring to the drawing which is for illustrative purposes only, and which shows diagrammatically a novel assembly of well known apparatus suited to carry on my invention, 1 is a hopper adapted to contain the solid material, 2 is a mixer adapted to produce a paste consisting of the solid material and water, 3 is an oil mixer in which the paste is dispersed in the body of oil, and 4 is an electric dehydrator in which the water and solid material are separated from the oil.

The water mixer 2 preferably consists of a tight shell 21 in which slowly moving paddles 22 are placed, these paddles being carried on a shaft 23 and driven by a pulley 24. The shaft 23 is mounted in suitable bearings 25 and 26. The solid material is fed slowly from the bin 1 into the mixer 2 and is mixed with water delivered thereto from a suitable source of water supply (not shown) by the pipe 27. I prefer to mix the material which is preferably kieselguhr, which passes through a 100 mesh screen but will not pass through a 200 mesh screen, with water to the consistency of a thick paste. The kieselguhr has a high water adsorptive value due to the fact that it is extremely porous. The resulting paste is mixed with oil in the oil mixer 3.

The oil mixer 3 consists of a shell 31 in which are placed paddles 32. The paddles 32 are carried on a shaft 33 having a pulley 34, the shaft being mounted in bearings 35 and 36. Oil is supplied through a pipe 37. In the mixer 3 I mix a small amount of the paste with the oil so that the mixture passing through a pipe 38 to the dehydrator 4 contains about a fraction of 1 per cent by weight of this paste.

The electric dehydrator 4 is of well known form, consisting of a tight tank 41 containing a lower grounded electrode 42, through the center of which the liquid is delivered, and containing an upper live electrode 43 suspended and insulated from the tank 41 by suspension insulators 44. The electrode 43 is connected by means of a wire 45 passing through an insulating bushing 46 in the wall of the tank 41 with one side of the secondary 47 of a transformer 48. The other side of this secondary is connected through a wire 49 with the tank 41, and thus with the grounded electrode 42. The primary 50 of the transformer 48 is connected through suitable control and indicating devices (not shown) with any suitable source of electric power (not shown).

In practice I utilize a potential of about 11000 volts at any standard frequency. In the dehydrator 4 the emulsion containing the solid matter in suspension is subjected to the action of the electric field set up between the grounded electrode 42 and the live electrode 43. The solid material or finely divided earth, which has been first wet with water in the water mixer 2 and which is widely dispersed in the form of particles through the body of the emulsion, acts as nuclei for the agglomeration of water, large water particles being built up by the electric field about such nuclei.

It is generally supposed that conducting chains are formed between the electrodes 42 and 43, these chains including fine water particles and the larger drops formed about the nuclei. Whether this theory is correct or not, I have discovered that by introducing these particles of water-wet solid material into the electric field, I can promote the agglomeration of the water and that the solid material is thrown down with the water and with certain other foreign matter into the bottom of the dehydrator, from which the water and solids may be withdrawn through a pipe 55. The cleaned oil is withdrawn from the top of the dehydrator through a pipe 56. I have also found that the solids, after being washed with water to remove any traces of oil or other foreign matter therefrom, may be partially dried and returned to the water mixer 2 for reuse.

I claim as my invention:

1. A process of separating water from emulsions which comprises: adding solid particles to the oil and thereafter agglomerating the water about these particles by the use of an electric current.

2. A process of separating water from emulsions which comprises: adding solid particles of a controlled size to the oil and thereafter agglomerating the water about these particles by the use of an electric current.

3. A process of separating water from petroleum emulsions which comprises: forming a paste by mixing solid particles with water; mixing said paste with said oil in such a manner as to cause said solid particles to go into suspension in the oil; and thereafter subjecting the oil to the action of an electric field in such a manner as to cause an agglomeration of the water particles about said solid particles.

4. A process of separating water from petroleum emulsions which comprises: forming a paste by mixing solid particles of a controlled size with water; mixing said paste with said oil in such a manner as to cause said solid particles to go into suspension in the oil; and thereafter subjecting the oil to the action of an electric field in such a manner as to cause an agglomeration of the water particles about said solid particles.

5. A process of separating water from emulsions which comprises: adding solid water-absorbent particles to the oil and thereafter agglomerating the water about these particles by the use of an electric current.

6. A process of separating water from emulsions which comprises: adding solid water-absorbent particles of a controlled size to the oil and thereafter agglomerating the water about these particles by the use of an electric current.

7. A process of separating water from petroleum emulsions which comprises: forming a paste by mixing solid water-absorbent particles with water; mixing said paste with said oil in such a manner as to cause said solid particles to go into suspension in the oil; and thereafter subjecting the oil to the action of an electric field in such a manner as to cause an agglomeration of the water particles about said solid particles.

8. A process of separating water from petroleum emulsions which comprises: forming a paste by mixing solid water-absorbent particles of a controlled size with water; mixing said paste with said oil in such a manner as to cause said solid particles to go into suspension in the oil; and thereafter subjecting the oil to the action of an electric field in such a manner as to cause an agglomeration of the water particles about said solid particles.

In testimony whereof, I have hereunto set my hand this 7th day of November, 1925, at Los Angeles, California.

FORD W. HARRIS.